| (12) United States Patent<br>Chen et al. | (10) Patent No.: US 10,069,890 B2<br>(45) Date of Patent: *Sep. 4, 2018 |
|---|---|

(54) WIRELESS VIDEO PERFORMANCE SELF-MONITORING AND ALERT SYSTEM

(71) Applicant: ARRIS Enterprises, Inc., Suwanee, GA (US)

(72) Inventors: Xi Chen, San Diego, CA (US); Bernard J. Meissner, Poway, CA (US); Lance M. Hobrock, Encinitas, CA (US); Alan R. Zeleznikar, Oceanside, CA (US); Meng Zhang, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/016,912

(22) Filed: Feb. 5, 2016

(65) Prior Publication Data

US 2016/0234093 A1 Aug. 11, 2016

Related U.S. Application Data

(60) Provisional application No. 62/114,636, filed on Feb. 11, 2015.

(51) Int. Cl.
*H04L 12/26* (2006.01)
*H04L 29/06* (2006.01)
(Continued)

(52) U.S. Cl.
CPC .......... *H04L 65/80* (2013.01); *H04L 41/5009* (2013.01); *H04L 41/509* (2013.01); *H04L 41/5032* (2013.01)

(58) Field of Classification Search
CPC ............. H04L 41/5067; H04L 41/5009; H04L 41/5032; H04L 41/509; H04L 65/4069;
(Continued)

(56) References Cited

U.S. PATENT DOCUMENTS 6,985,476 B1 * 1/2006 Elliott ..................... H04L 45/00
370/349
9,609,549 B2 * 3/2017 Nguyen .............. H04W 28/085
(Continued)

FOREIGN PATENT DOCUMENTS

EP 2530870 A1 12/2012

OTHER PUBLICATIONS

PCT Search Report & Written Opinion, Re: Application No. PCT/US2016/016793, dated May 10, 2016.

*Primary Examiner* — Alina A Boutah
(74) *Attorney, Agent, or Firm* — Bart A. Perkins

(57) ABSTRACT

Methods, systems, and computer readable media can be operable to facilitate a self-monitoring of the performance of a wireless video service that is provided by a customer premise equipment (CPE) device. A CPE device such as an access point may periodically or continuously retrieve wireless video performance parameters associated with one or more devices receiving a wireless video service from the CPE device and/or one or more wireless links used by the CPE device to deliver wireless video services. The CPE device may consolidate retrieved parameters into a wireless video performance index and may compare the wireless video performance index to a threshold range. If the video performance index lies outside of the threshold range, the CPE device may output an alert to a device controlled by a content provider. The alert may provide a notification of an issue with the delivery of wireless video services by the CPE device.

20 Claims, 4 Drawing Sheets

(51) Int. Cl.
*H04W 24/10* (2009.01)
*H04L 12/24* (2006.01)

(58) Field of Classification Search
CPC ................. H04L 65/80; H04N 21/238; H04N 21/23805; H04N 21/2402; H04N 21/64723; H04W 36/0033; H04W 36/30
USPC ........................................................ 709/224
See application file for complete search history.

(56) References Cited

U.S. PATENT DOCUMENTS

| | | | | |
|---|---|---|---|---|
| 2003/0014665 | A1* | 1/2003 | Anderson | H04L 63/0227 726/4 |
| 2005/0060573 | A1* | 3/2005 | D'Souza | H04L 63/1441 726/4 |
| 2007/0180106 | A1 | 8/2007 | Pirzada et al. | |
| 2008/0031130 | A1* | 2/2008 | Raj | H04L 45/00 370/225 |
| 2009/0180401 | A1* | 7/2009 | Guan | H04L 45/00 370/255 |
| 2012/0002567 | A1* | 1/2012 | Sun | H04W 28/16 370/252 |
| 2012/0311126 | A1* | 12/2012 | Jadallah | H04L 41/5067 709/224 |
| 2013/0142033 | A1* | 6/2013 | Zhang | H04B 7/0691 370/216 |
| 2013/0159498 | A1* | 6/2013 | Funge | H04L 65/80 709/224 |
| 2013/0166638 | A1* | 6/2013 | Theado | G06Q 20/027 709/204 |
| 2013/0315098 | A1* | 11/2013 | Bombacino | H04W 48/08 370/254 |
| 2014/0033242 | A1 | 1/2014 | Rao et al. | |
| 2015/0043325 | A1* | 2/2015 | Tsukamoto | H04W 24/10 370/216 |
| 2015/0055493 | A1* | 2/2015 | Suga | H04W 48/16 370/252 |
| 2015/0055506 | A1* | 2/2015 | Birlik | H04W 16/10 370/254 |
| 2015/0236909 | A1* | 8/2015 | Valluri | H04L 41/0836 370/229 |
| 2015/0289142 | A1* | 10/2015 | Abeysekera | H04W 24/02 370/338 |
| 2015/0341812 | A1* | 11/2015 | Dion | H04W 24/08 370/252 |
| 2016/0044588 | A1* | 2/2016 | Li | H04W 48/08 455/434 |
| 2017/0111670 | A1* | 4/2017 | Ducloux | H04N 19/40 |
| 2017/0251413 | A1* | 8/2017 | Wheelock | H04W 36/0033 |

* cited by examiner

WIRELESS VIDEO PERFORMANCE SELF-MONITORING AND ALERT SYSTEM

CROSS REFERENCE TO RELATED APPLICATION

This application is a non-provisional application claiming the benefit of U.S. Provisional Application Ser. No. 62/114,636, entitled "Wireless Video Performance Self-Monitoring and Alert System," which was filed on Feb. 11, 2015, and is incorporated herein by reference in its entirety.

TECHNICAL FIELD

This disclosure relates to self-monitoring of wireless video performance by a device.

BACKGROUND

Customer premise equipment (CPE) devices may be installed within a premise to deliver a plurality of different services. One such service may include the wireless delivery of video or other multimedia services. Multimedia content delivered over a wireless network can be particularly vulnerable to problems arising in the transmission, delivery, and processing of the content. For example, issues may arise with a CPE device (e.g., wireless gateway, access point, etc.) installed at a premise to deliver wireless communications to client devices, and the issues may cause noticeable problems on a wireless link used to carry wireless communications from the CPE device to a client device and/or at a client device receiving the wireless service.

Typically, service providers are forced to rely on server based systems to access the operational status of wireless video devices located at the customer premise. These server based systems can query the operational condition of a device on a periodic basis. However, these server systems are not designed to monitor real-time wireless video performance, and are not actively alerted when operational issues arise. Thus, service providers may not become aware of a potential issue with a wireless CPE device until the customer has already noticed a degradation in the quality of the wireless video service and/or has contacted the service provider. Moreover, service providers lack a performance check tool to ensure the successful installation of wireless video devices. Therefore, it is desirable to improve upon methods and systems for monitoring the performance of a wireless service that is delivered to a customer premise.

BRIEF DESCRIPTION OF THE DRAWINGS

Like reference numbers and designations in the various drawings indicate like elements.

DETAILED DESCRIPTION

Figure 1:
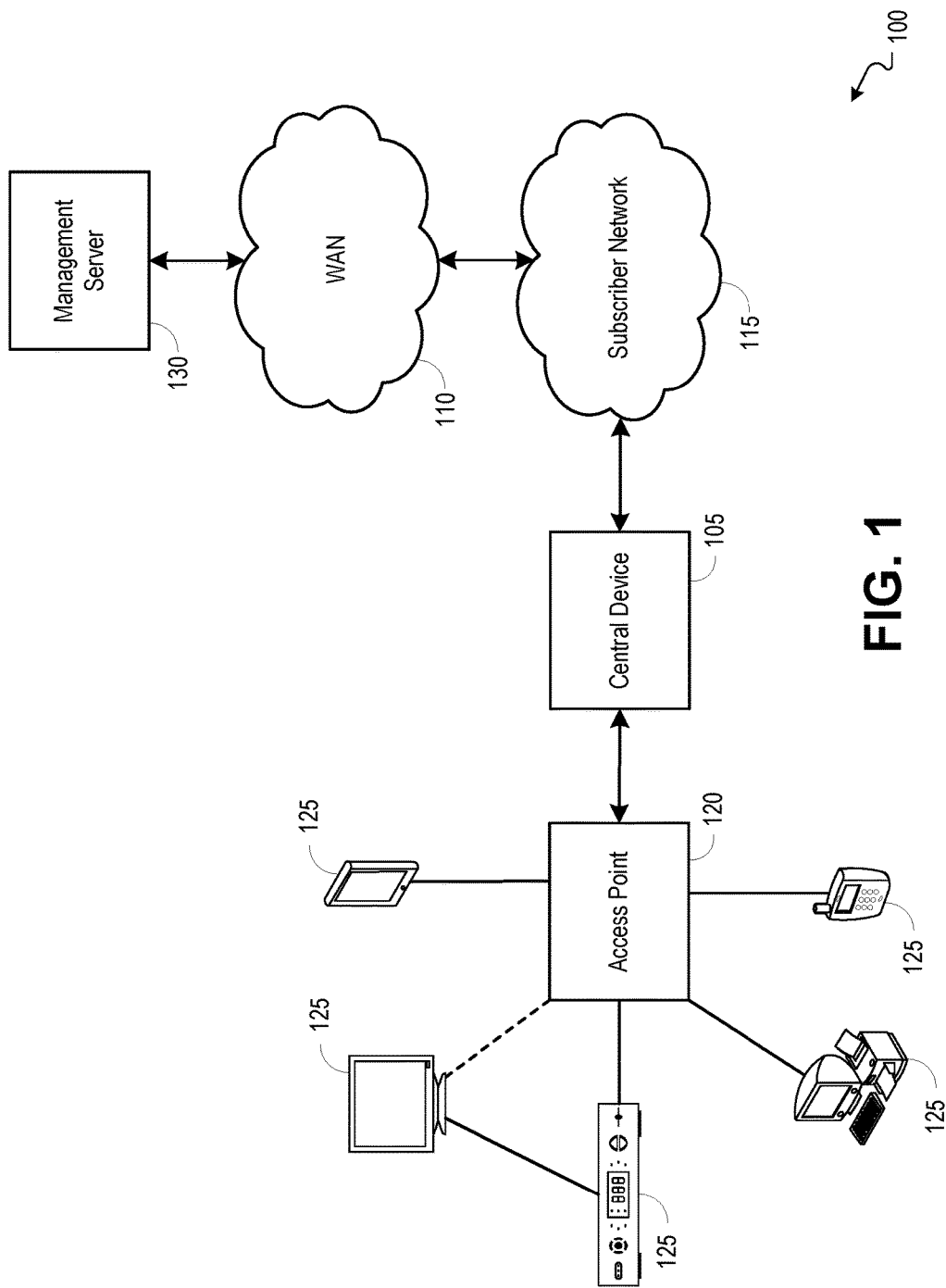
FIG. 1 is a block diagram illustrating an example network environment operable to facilitate a self-monitoring of the performance of a wireless video service that is provided by a device.

It is desirable to improve upon methods and systems for detecting issues with the delivery of wireless communications by a subscriber premise device. Methods, systems, and computer readable media can be operable to facilitate a self-monitoring of the performance of a wireless video service that is provided by a subscriber premise device. A subscriber premise device such as an access point may periodically or continuously retrieve wireless video performance parameters associated with one or more devices receiving a wireless video service from the subscriber premise device and/or one or more wireless links used by the subscriber premise device to deliver wireless video services. The subscriber premise device may consolidate retrieved parameters into a wireless video performance index and may compare the wireless video performance index to a threshold range. If the video performance index lies outside of the threshold range, the subscriber premise device may output an alert to a device controlled by a content provider. The alert may provide a notification of an issue with the delivery of wireless video services by the subscriber premise device.

An embodiment of the invention described herein may include a method comprising: (a) retrieving one or more parameters associated with the delivery of a wireless video service from an access point to one or more client devices; (b) determining a wireless video performance index value by consolidating one or more of the one or more retrieved parameters; and (c) if the wireless video performance index value is outside of a predetermined threshold range: (i) generating an alert message, wherein the alert message comprises an indication that an issue exists with respect to the wireless video service being delivered by the access point; and (ii) outputting the alert message to an upstream server.

According to an embodiment of the invention, the retrieved one or more parameters are associated with one or more of the client devices to which the wireless video service is delivered.

According to an embodiment of the invention, the retrieved one or more parameters are associated with one or more wireless links over which the wireless video service is delivered to the one or more client devices.

According to an embodiment of the invention, consolidating the one or more retrieved parameters to determine the wireless video performance index value comprises a weighting of each respective one of the one or more retrieved parameters according to the impact of the respective parameter on the performance of the wireless video service.

According to an embodiment of the invention, the alert message comprises one or more of the one or more retrieved parameters.

According to an embodiment of the invention, the one or more parameters are retrieved by the access point periodically.

According to an embodiment of the invention, the wireless video performance index value is determined by the access point when at least one of the one or more retrieved parameters is outside of a predetermined threshold range.

An embodiment of the invention described herein may include an apparatus comprising: (a) one or more modules configured to: (i) retrieve one or more parameters associated with the delivery of a wireless video service to one or more client devices; (ii) determine a wireless video performance index value by consolidating one or more of the one or more retrieved parameters; and (iii) if the wireless video performance index value is outside of a predetermined threshold range, generate an alert message, wherein the alert message comprises an indication that an issue exists with respect to the wireless video service being delivered to the one or more client devices; and (b) an interface configured to be used to output the alert message to an upstream server.

An embodiment of the invention described herein may include one or more non-transitory computer readable media having instructions operable to cause one or more processors to perform the operations comprising: (a) retrieving one or more parameters associated with the delivery of a wireless video service from an access point to one or more client devices; (b) determining a wireless video performance index value by consolidating one or more of the one or more retrieved parameters; and (c) if the wireless video performance index value is outside of a predetermined threshold range: (i) generating an alert message, wherein the alert message comprises an indication that an issue exists with respect to the wireless video service being delivered by the access point; and (ii) outputting the alert message to an upstream server.

FIG. 1 is a block diagram illustrating an example network environment 100 operable to facilitate a self-monitoring of the performance of a wireless video service that is provided by a device. In embodiments, a central device 105 may provide video, audio and/or data services to a subscriber by communicating with a wide area network (WAN) 110 through a connection to a subscriber network 115 (e.g., hybrid fiber-coaxial network, fiber network, cellular network, high speed data network, etc.). The central device 105 may include a gateway device, a broadband modem, a wireless router including an embedded modem, or any other device operable to route communications between one or more client devices and a network. The central device 105 may provide a local network for delivering services to one or more client devices (e.g., a local area network (LAN), a wireless local area network (WLAN), a personal area network (PAN), etc.).

In embodiments, an access point 120 may deliver one or more services to one or more devices (e.g., client devices 125) over a wireless network (e.g., WLAN) provided by the access point 120. The access point 120 may route communications to and from one or more stations (STA) that are associated with the access point 120. For example, a client device 125 may associate with the access point 120 as a STA, and may receive services such as wireless video from the access point 120. It should be understood that an access point 120 may include any device configured to route wireless communications to and from one or more STAs (e.g., wireless clients).

A subscriber can request, receive and interact with multimedia and/or data services through a client device 125. A client device 125 may include a set-top box (STB), computer, mobile device, tablet, television, and any other device operable to receive wireless video services. Wireless video services and other multimedia and/or data services may be received at a client device 125 through a connection to an access point 120. Client devices 125 may communicate with an access point 120 or another client device 125 (e.g., a client device 125 operating as a STA of the access point 120) over a wireless link (e.g., Wi-Fi link) or a wired link (e.g., Ethernet link, multimedia over coax alliance (MoCA) link, etc.). It should be understood that a television may receive video services and other multimedia and/or data services through a connection to an access point 120 and/or a STB.

While the components shown in FIG. 1 are shown separate from each other, it should be understood that the various components can be integrated into each other.

In embodiments, a central device 105 or an access point 120 may monitor the condition of wireless services provided to one or more STAs or client devices 125 and/or the condition of wireless links used to deliver the wireless services to one or more STAs or client devices 125. Monitored conditions may include: the performance of a STA or wireless video client (e.g., client device 125), along with any devices associated with a STA or wireless video client; the stability of the wireless video device environment (e.g., Wi-Fi links used for delivery of video); interference conditions of the wireless video device environment; and other conditions.

An access point 120 (or a central device 105) may periodically or continuously retrieve parameters associated with the various monitored conditions of client devices and wireless links, and the access point 120 may compile and analyze the retrieved parameters to determine whether video services are being delivered to client devices 125 at a sufficient or desirable quality level. If the analysis of the retrieved parameters indicates that video services are being delivered to client devices 125 at a less than desirable quality level, the access point 120 may generate and output an alert message to an upstream subscriber device (e.g., central device 105) or to an upstream server managed by a service provider (e.g., management server 130).

In embodiments, the determination whether retrieved parameters indicate an issue with the delivery of video services may be based upon a comparison of one or more parameters to one or more parameter thresholds. The access point 120 may compare retrieved parameters to one or more corresponding parameter thresholds with which the access point 120 is configured. Parameter thresholds configured at the access point 120 may be modified, for example, by a service provider, in order to configure the video delivery quality level at which an alert message is triggered.

In embodiments, the access point 120 may generate a wireless video index by consolidating each of the one or more retrieved parameters associated with the various monitored conditions of client devices and wireless links. For example, the access point 120 may generate a single wireless video index value that incorporates each of one or more retrieved parameters by weighting each parameter according to the parameter's impact on the delivery of wireless video services from the access point 120. The access point 120 may compare the wireless video index to an index threshold with which the access point 120 is configured. The index threshold configured at the access point 120 may be modified, for example, by a service provider, in order to configure the video delivery quality level at which an alert message is triggered. It should be understood that references to an access point 120, as used herein, may also refer to a central device 105, thus functions carried out by an access point 120 may be carried out by a central device that is operating as an access point (e.g., routing communications to and from one or more wireless STAs).

Figure 2:
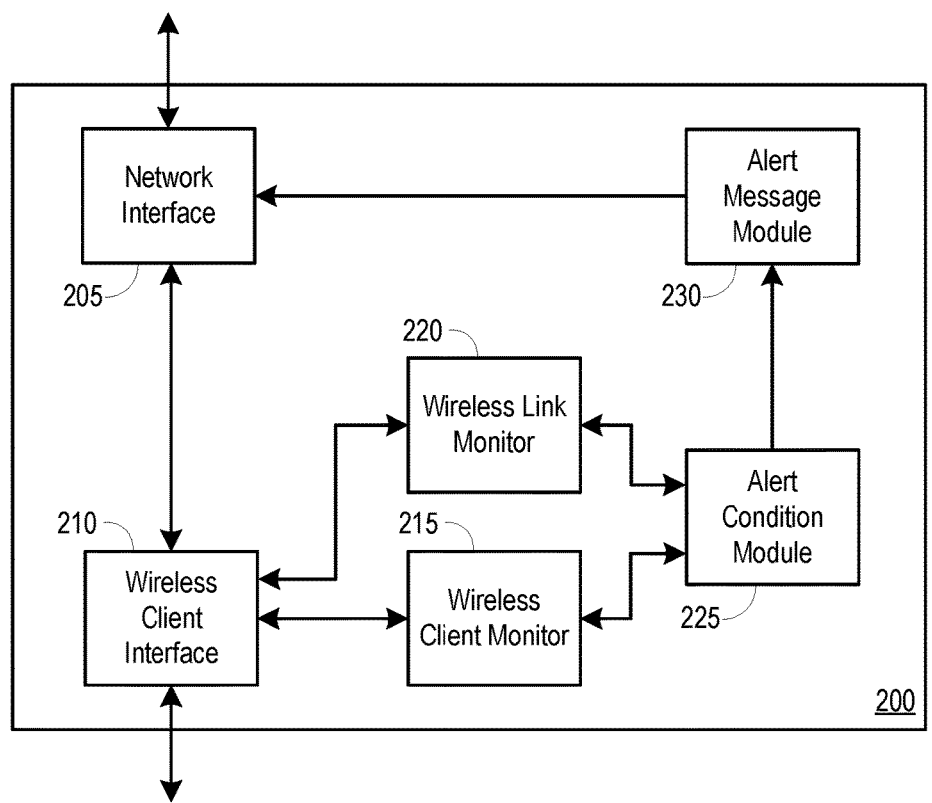
FIG. 2 is a block diagram illustrating an example access device operable to facilitate a self-monitoring of the performance of a wireless video service provided by the access device.

FIG. 2 is a block diagram illustrating an example access device 200 operable to facilitate a self-monitoring of the performance of a wireless video service provided by the access device 200. The access device 200 may include a network interface 205, a wireless client interface 210, a wireless client monitor 215, a wireless link monitor 220, an alert condition module 225, and an alert message module 230. The access device 200 may be a central device 105 of FIG. 1, an access point 120 of FIG. 1, or any other device configured to route wireless communications to and from one or more wireless STAs.

In embodiments, the access device 200 may communicate with an upstream subscriber device (e.g., central device 105 of FIG. 1) or upstream network (e.g., subscriber network 115 of FIG. 1, WAN 110 of FIG. 1, etc.) through the network interface 205. The access device 200 may receive communications and/or video or multimedia services from an upstream subscriber device or network and may wirelessly transmit the communications and/or video or multimedia services over one or more wireless links to one or more STAs (e.g., client devices 125 of FIG. 1) through the wireless client interface 210. It will be appreciated by those skilled in the relevant art that various wireless techniques, standards, and protocols may be used to transmit and deliver the communications and/or video or multimedia services to the one or more STAs.

In embodiments, the wireless client monitor 215 may identify one or more STAs (e.g., client devices 125 of FIG. 1) that are associated with the access device 200 and may retrieve one or more parameters associated with the delivery of wireless video services to the one or more STAs. The wireless client monitor 215 may retrieve one or more parameters associated with one or more characteristics of wireless video delivery to one or more associated STAs. For example, the wireless client monitor 215 may retrieve parameters associated with a performance characteristic, a stability characteristic, and/or an interference characteristic associated with each STA associated with the access device 200 and/or each wireless link through which communications are passed between the access device 200 and each associated STA. The wireless client monitor 215 may compare a retrieved parameter to a threshold range, and if the parameter is outside of the threshold range, the wireless client monitor 215 may cause the alert condition module 225 to initiate an analysis of the performance of wireless video services being delivered by the access device 200 to one or more STAs or client devices 125.

Certain parameters may provide an indication of the status of each characteristic associated with the delivery of wireless video services to one or more STAs. Monitoring the performance of a wireless video device (e.g., associated STA) may include measuring a number of different parameters and establishing a historical performance trend for the device for each parameter (e.g., wireless traffic data error rate/packet error rate, wireless video link quality/average throughput, etc.). Wireless video device stability may be monitored based on the following parameters: association/disassociation status; received signal strength indication (RSSI), channel change history; kernel status/free memory/process status; and others. Wireless video system interference may be monitored based on the following parameters: airtime percentage; nearby interference level; noise on radio frequency (RF) channel, signal-to-noise ratio (SNR); and others. Wireless video device stability may be monitored based on the following parameters: association/disassociation status; received signal strength indication (RSSI), channel change history; kernel status/free memory/process status; and others. It should be understood that one or more of the parameters may be measured by the access device 200 or may be retrieved by the access device 200 from an associated STA.

In embodiments, the wireless link monitor 220 may identify one or more links (e.g., Wi-Fi links provided by the wireless client interface 210) that are used by the access device 200 to deliver video services to one or more associated STAs and/or client devices 125, and the wireless link monitor 220 may retrieve one or more parameters associated with the delivery of wireless video services over the one or more links. The wireless link monitor 220 may retrieve one or more parameters associated with one or more characteristics of wireless video delivery over the one or more links. For example, the wireless link monitor 220 may retrieve parameters associated with a performance characteristic, a stability characteristic, and/or an interference characteristic associated with each wireless link through which communications are passed between the access device 200 and each associated STA or client device 125. The wireless link monitor 220 may compare a retrieved parameter to a threshold range, and if the parameter is outside of the threshold range, the wireless link monitor 220 may cause the alert condition module 225 to initiate an analysis of the performance of wireless video services being delivered by the access device 200 to one or more STAs or client devices 125. It should be understood that one or more of the parameters may be measured by the access device 200 or may be retrieved by the access device 200 from an associated STA.

In embodiments, the alert condition module 225 may determine a wireless video performance index. A wireless video performance index may be based upon one or more parameters retrieved by the wireless client monitor 215 and/or the wireless link monitor 220. The alert condition module 225 may determine a wireless video performance index by consolidating one or more retrieved wireless video performance parameters associated with one or more links used by the access device 200 to deliver wireless video services and/or one or more STAs or client devices 125 to which wireless video services are provided by the access device 200. In embodiments, a wireless video performance index may be determined for each characteristic (e.g., wireless system performance, wireless device stability, and wireless system interference) associated with the delivery of wireless video services by incorporating each parameter associated with each respective characteristic into a single wireless video performance index value. It should be understood that the incorporation of each parameter into a wireless video performance index may be weighted such that the parameters having the most impact on wireless video delivery are given the highest weight within the overall wireless video performance index.

In embodiments, the alert condition module 225 may determine a single wireless video performance index value that incorporates one or more retrieved wireless video performance parameters associated with each of the characteristics that are associated with the delivery of wireless video services. For example, the single wireless video performance index value may be determined by incorporating obtained metrics of one or more of the following metrics: wireless traffic data error rate and packet error rate; wireless video link quality/average throughput; noise on RF channel (e.g., SNR); nearby interference level; air time percentage; RSSI; channel change history; association/disassociation status; kernel status/free memory/process; and others. It should be understood that the incorporation of each parameter into a wireless video performance index may be weighted such that the parameters having the most impact on wireless video delivery are given the highest weight within the overall wireless video performance index.

The alert condition module 225 may compare a wireless video performance index, or individual retrieved parameters, to a threshold range and may determine whether the wireless video performance index, or individual retrieved parameters, are outside of the threshold range. The alert condition module 225 may be configured with a predetermined threshold range within which the wireless video performance index, or other parameter, should lie when wireless video services are being delivered at a sufficient or desirable quality level. The predetermined threshold range may be set and/or modified, for example, by a service provider, to configure or adjust the wireless video service quality level that requires the delivery of a notification to the service provider.

If the alert condition module 225 determines that the wireless video performance index, or other parameter, is outside of a corresponding threshold range, an alert message module 230 may generate and output an alert message, wherein the alert message includes an indication that video services provided by the access device 200 may potentially be operating at a less than desirable quality level. The alert message may include the single wireless video performance index, the wireless video performance index as determined for each wireless video service characteristic, and/or each parameter retrieved by the wireless client monitor 215 and/or wireless link monitor 220. In embodiments, the alert message may include a summary indicating the current status of the wireless video services provided by the access device 200, wherein the status is based on the extent by which the wireless video performance index lies outside of the threshold range.

The alert message module 230 may output the alert message to a subscriber via the network interface 205 or wireless client interface 210, and/or the alert message module 230 may output the alert message to a technician or content provider (e.g., management server 130 of FIG. 1) via the network interface 205. The alert message may be presented to an end-user (e.g., the information may be presented within a web graphical user interface (WebGUI)).

Figure 3:
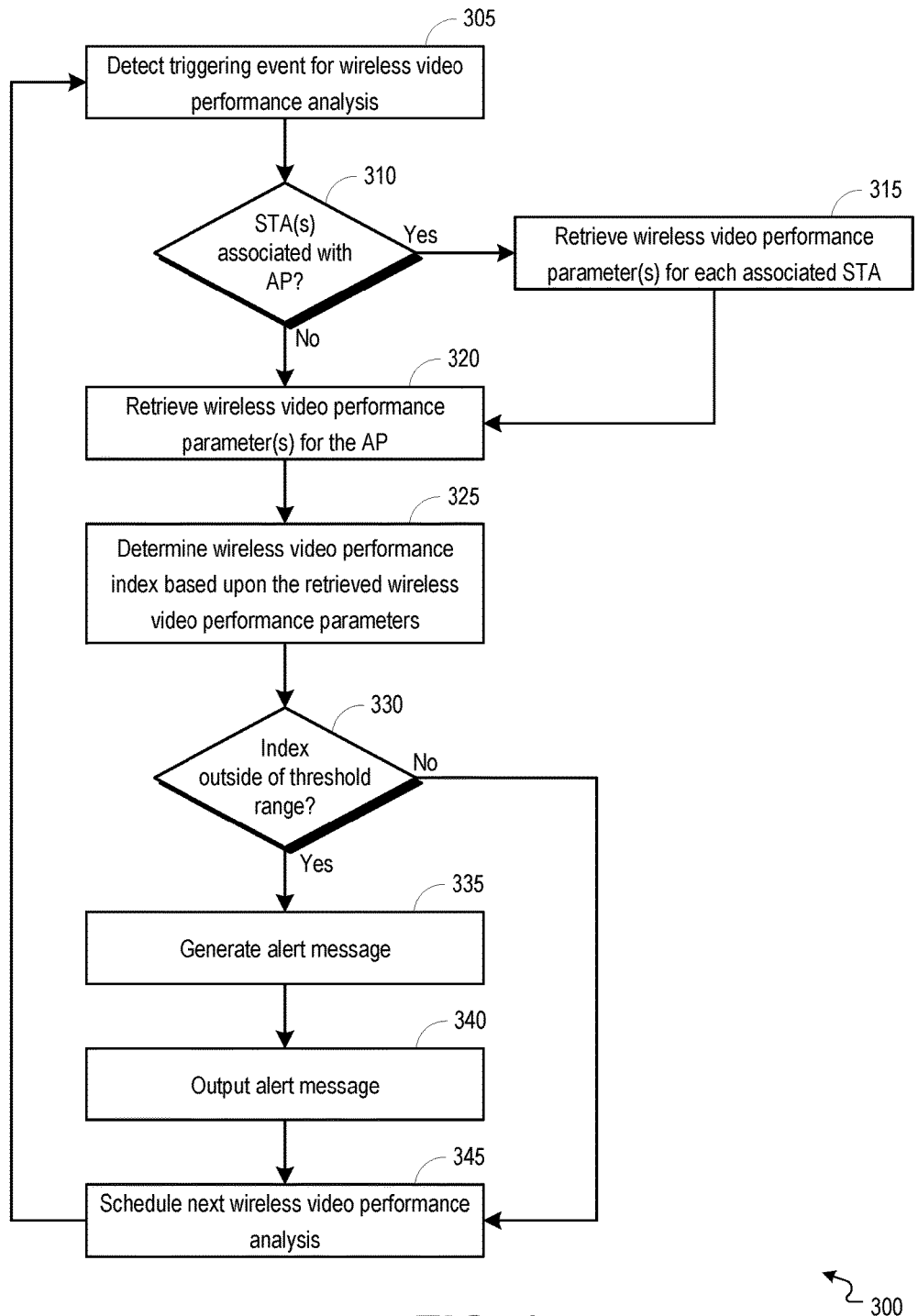
FIG. 3 is a flowchart illustrating an example process operable to facilitate a self-monitoring and reporting of the performance of a wireless video service that is provided by a device.

FIG. 3 is a flowchart illustrating an example process 300 operable to facilitate a self-monitoring and reporting of the performance of a wireless video service that is provided by a device. The process 300 may be carried out by an access device (e.g., central device 105 of FIG. 1, access point 120 of FIG. 1, etc.) providing wireless video services to one or more stations or client devices (e.g., client devices 125 of FIG. 1). It should be understood that the process 300 may be carried out continuously or periodically. The process 300 may begin at 305 when a triggering event for a wireless video performance analysis is detected. The triggering event may be detected by an access device (e.g., at an alert condition module 225 of FIG. 2) and may include a message received from a subscriber requesting that an analysis be performed, a message received from a service provider (e.g., from a management server 130 of FIG. 1) requesting that an analysis be performed, the arrival of a scheduled time for running an analysis, the identification of a less than desirable quality level in the delivery of a wireless video service (e.g., wireless parameter falling outside of a threshold range or level), and others. The process 300 may be initiated according to TR-181.

At 310, a determination may be made whether one or more stations (STAs) (e.g., client devices 125 of FIG. 1) are associated with the access device. The determination whether one or more STAs are associated with the access device may be made, for example, by a wireless client monitor 215 of FIG. 2. If the determination is made that one or more STAs are associated with the access device, the one or more STAs may be identified and the process 300 may proceed to 315. At 315, one or more wireless video performance parameters may be retrieved from each of the one or more associated STAs. Wireless video performance parameters associated with the one or more STAs may be retrieved, for example, by a wireless client monitor 215 of FIG. 2 and/or a wireless link monitor 220 of FIG. 2. In embodiments, the access device may retrieve one or more parameters associated with one or more characteristics of wireless video delivery. For example, the access device may retrieve parameters associated with a performance characteristic, a stability characteristic, and/or an interference characteristic associated with each STA associated with the access device and/or each wireless link through which communications are passed between the access device and each associated STA. It should be understood that the access device may measure and generate the one or more wireless video performance parameters, or the one or more wireless video performance parameters may be retrieved by the access device from one or more STAs.

Certain parameters may provide an indication of the status of each characteristic associated with the delivery of wireless video services to one or more STAs. Monitoring the performance of a wireless video device (e.g., associated STA) may include measuring a number of different parameters and establishing a historical performance trend for the device for each parameter (e.g., wireless traffic data error rate/packet error rate, wireless video link quality/average throughput, etc.). Wireless video device stability may be monitored based on the following parameters: association/disassociation status; received signal strength indication (RSSI), channel change history; kernel status/free memory/process status; and others. Wireless video system interference may be monitored based on the following parameters: airtime percentage; nearby interference level; noise on radio frequency (RF) channel, signal-to-noise ratio (SNR); and others. Wireless video device stability may be monitored based on the following parameters: association/disassociation status; received signal strength indication (RSSI), channel change history; kernel status/free memory/process status; and others.

If, at 310, the determination is made that no STAs are associated with the access device, the process 300 may proceed to 320. At 320, one or more wireless video performance parameters may be retrieved for the access device. Wireless video performance parameters associated with the access device may be retrieved, for example by a wireless client monitor 215 of FIG. 2 and/or a wireless link monitor 220 of FIG. 2. In embodiments, the access device may retrieve one or more parameters associated with one or more characteristics of wireless video delivery. For example, the access device may retrieve parameters associated with a performance characteristic, a stability characteristic, and/or an interference characteristic associated with the access device and/or each wireless link through which communications are passed between the access device and any STAs that might be associated with the access device.

At 325, a wireless video performance index may be determined based upon the retrieved wireless video performance parameters. A wireless video performance index may be determined, for example, by an alert condition module 225 of FIG. 2. The alert condition module 225 may determine a wireless video performance index by consolidating one or more retrieved wireless video performance parameters associated with the access device, and if available, one or more retrieved wireless video performance parameters associated with any STAs that might be associated with the access device. In embodiments, a wireless video performance index may be determined for each characteristic (e.g., wireless system performance, wireless device stability, and wireless system interference) associated with the delivery of wireless video services by incorporating each parameter associated with each respective characteristic into a single wireless video performance index value. It should be understood that the incorporation of each parameter into a wireless video performance index may be weighted such that the parameters having the most impact on wireless video delivery are given the highest weight within the overall wireless video performance index.

In embodiments, the alert condition module 225 may determine a single wireless video performance index value that incorporates one or more retrieved wireless video performance parameters associated with each of the characteristics that are associated with the delivery of wireless video services. For example, the single wireless video performance index value may be determined by incorporating obtained metrics of one or more of the following metrics: wireless traffic data error rate and packet error rate; wireless video link quality/average throughput; noise on RF channel (e.g., SNR); nearby interference level; air time percentage; RSSI; channel change history; association/disassociation status; kernel status/free memory/process; and others. It should be understood that the incorporation of each parameter into a wireless video performance index may be weighted such that the parameters having the most impact on wireless video delivery are given the highest weight within the overall wireless video performance index.

At 330, a determination may be made whether the determined wireless video performance index is outside of a threshold range. The determination whether the wireless video performance index is outside of a threshold range may be made, for example, by the alert condition module 225. In embodiments, the access device may be configured with a predetermined threshold range within which the wireless video performance index should lie when wireless video services are being delivered at a sufficient or desirable quality level. The predetermined threshold range may be set and/or modified, for example, by a service provider, to configure or adjust the wireless video service quality level that requires the delivery of a notification to the service provider.

If, at 330, the determination is made the wireless video performance index is outside of a threshold range, the process 300 may proceed to 335. At 335, an alert message may be generated. An alert message may be generated, for example, by an alert message module 230 of FIG. 2. In embodiments, the alert message may include an indication that video services provided by the access device may potentially be operating at a less than desirable quality level. The alert message may include the single wireless video performance index, the wireless video performance index as determined for each wireless video service characteristic, and/or each parameter retrieved by the access device. In embodiments, the alert message may include a summary indicating the current status of the wireless video services provided by the access device, wherein the status is based on the extent by which the wireless video performance index lies outside of the threshold range. The alert message may be output according to the triggering of an active inform TR-181 client.

At 340, the alert message may be output. The alert message may be output, for example, by an alert message module 230 of FIG. 2. In embodiments, the alert message may be output to an end-user (e.g., subscriber, technician, content provider, etc.). The alert message may be output from the access device to an upstream server (e.g., management server 130 of FIG. 1) operated by a content provider, and the information carried by the alert message may be presented to an end-user (e.g., the information may be presented within a web graphical user interface (WebGUI)).

At 345, a next wireless video performance analysis may be scheduled. For example, a timer may be initiated for a predetermined duration of time, and at the expiration of the timer, a triggering event may be detected by the access device at 305.

Figure 4:
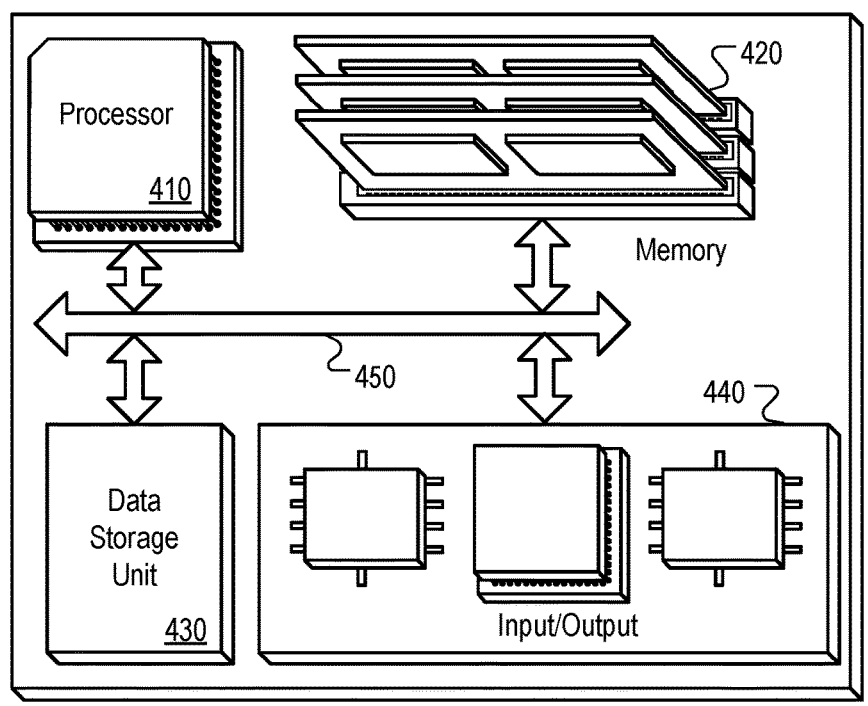
FIG. 4 is a block diagram of a hardware configuration operable to facilitate a self-monitoring of the performance of a wireless video service that is provided by a device.

FIG. 4 is a block diagram of a hardware configuration 400 operable to facilitate a self-monitoring of the performance of a wireless video service that is provided by a device. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for communicating with a central device 105 of FIG. 1 and for outputting video and/or data services to a client device 125 of FIG. 1 (e.g., STB, television, computer, tablet, mobile device, etc.). In embodiments, the input/output device can include driver devices configured to send communications to, and receive communications from one or more networks (e.g., WLAN provided by an access point 120 of FIG. 1, subscriber network 115 of FIG. 1, WAN 110 of FIG. 1, etc.).

Those skilled in the art will appreciate that the invention improves upon methods and systems for detecting issues with the delivery of wireless communications by a subscriber premise device. Methods, systems, and computer readable media can be operable to facilitate a self-monitoring of the performance of a wireless video service that is provided by a subscriber premise device. A subscriber premise device such as an access point may periodically or continuously retrieve wireless video performance parameters associated with one or more devices receiving a wireless video service from the subscriber premise device and/or one or more wireless links used by the subscriber premise device to deliver wireless video services. The subscriber premise device may consolidate retrieved parameters into a wireless video performance index and may compare the wireless video performance index to a threshold range. If the video performance index lies outside of the threshold range, the subscriber premise device may output an alert to a device controlled by a content provider. The alert may provide a notification of an issue with the delivery of wireless video services by the subscriber premise device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    retrieving one or more parameters associated with the delivery of a wireless video service from an access point to one or more client devices, wherein the one or more parameters are retrieved by the access point;
    determining, at the access point, a wireless video performance index value by consolidating one or more of the one or more retrieved parameters; and
    if the wireless video performance index value is outside of a predetermined threshold range:
    generating an alert message, wherein the alert message comprises an indication that an issue exists with respect to the wireless video service being delivered by the access point; and
    outputting the alert message, wherein the alert message is output from the access point to a server that is located upstream from the access point.

2. The method of claim 1, wherein the retrieved one or more parameters are associated with one or more of the client devices to which the wireless video service is delivered.

3. The method of claim 1, wherein the retrieved one or more parameters are associated with one or more wireless links over which the wireless video service is delivered to the one or more client devices.

4. The method of claim 1, wherein consolidating the one or more retrieved parameters to determine the wireless video performance index value comprises a weighting of each respective one of the one or more retrieved parameters according to the impact of the respective parameter on the performance of the wireless video service.

5. The method of claim 1, wherein the alert message comprises one or more of the one or more retrieved parameters.

6. The method of claim 1, wherein the one or more parameters are retrieved by the access point periodically.

7. The method of claim 1, wherein the wireless video performance index value is determined by the access point when at least one of the one or more retrieved parameters is outside of a predetermined threshold range.

8. An apparatus comprising:
one or more modules configured to:
deliver a wireless video service to one or more clients;
retrieve one or more parameters associated with the delivery of the wireless video service to the one or more client devices;
determine a wireless video performance index value by consolidating one or more of the one or more retrieved parameters; and
if the wireless video performance index value is outside of a predetermined threshold range, generate an alert message, wherein the alert message comprises an indication that an issue exists with respect to the wireless video service being delivered to the one or more client devices; and
an interface configured to be used to output the alert message to an upstream server, wherein the upstream server is located upstream from the apparatus.

9. The apparatus of claim 8, wherein the retrieved one or more parameters are associated with one or more of the client devices to which the wireless video service is delivered.

10. The apparatus of claim 8, wherein the retrieved one or more parameters are associated with one or more wireless links over which the wireless video service is delivered to the one or more client devices.

11. The apparatus of claim 8, wherein consolidating the one or more retrieved parameters to determine the wireless video performance index value comprises a weighting of each respective one of the one or more retrieved parameters according to the impact of the respective parameter on the performance of the wireless video service.

12. The apparatus of claim 8, wherein the alert message comprises one or more of the one or more retrieved parameters.

13. The apparatus of claim 8, wherein the wireless video performance index value is determined when at least one of the one or more retrieved parameters is outside of a predetermined threshold range.

14. One or more non-transitory computer readable media having instructions operable to cause one or more processors to perform the operations comprising:
retrieving one or more parameters associated with the delivery of a wireless video service from an access point to one or more client devices, wherein the one or more parameters are retrieved by the access point;
determining, at the access point, a wireless video performance index value by consolidating one or more of the one or more retrieved parameters; and
if the wireless video performance index value is outside of a predetermined threshold range:
generating an alert message, wherein the alert message comprises an indication that an issue exists with respect to the wireless video service being delivered by the access point; and
outputting the alert message to an upstream server, wherein the upstream server is located upstream from the access point.

15. The one or more non-transitory computer-readable media of claim 14, wherein the retrieved one or more parameters are associated with one or more of the client devices to which the wireless video service is delivered.

16. The one or more non-transitory computer-readable media of claim 14, wherein the retrieved one or more parameters are associated with one or more wireless links over which the wireless video service is delivered to the one or more client devices.

17. The one or more non-transitory computer-readable media of claim 14, wherein consolidating the one or more retrieved parameters to determine the wireless video performance index value comprises a weighting of each respective one of the one or more retrieved parameters according to the impact of the respective parameter on the performance of the wireless video service.

18. The one or more non-transitory computer-readable media of claim 14, wherein the alert message comprises one or more of the one or more retrieved parameters.

19. The one or more non-transitory computer-readable media of claim 14, wherein the one or more parameters are retrieved by the access point periodically.

20. The one or more non-transitory computer-readable media of claim 14, wherein the wireless video performance index value is determined by the access point when at least one of the one or more retrieved parameters is outside of a predetermined threshold range.

* * * * *